April 8, 1952   L. J. DU MAIS ET AL   2,591,686
PICTURE SCREEN STAND
Filed March 14, 1951   2 SHEETS—SHEET 1
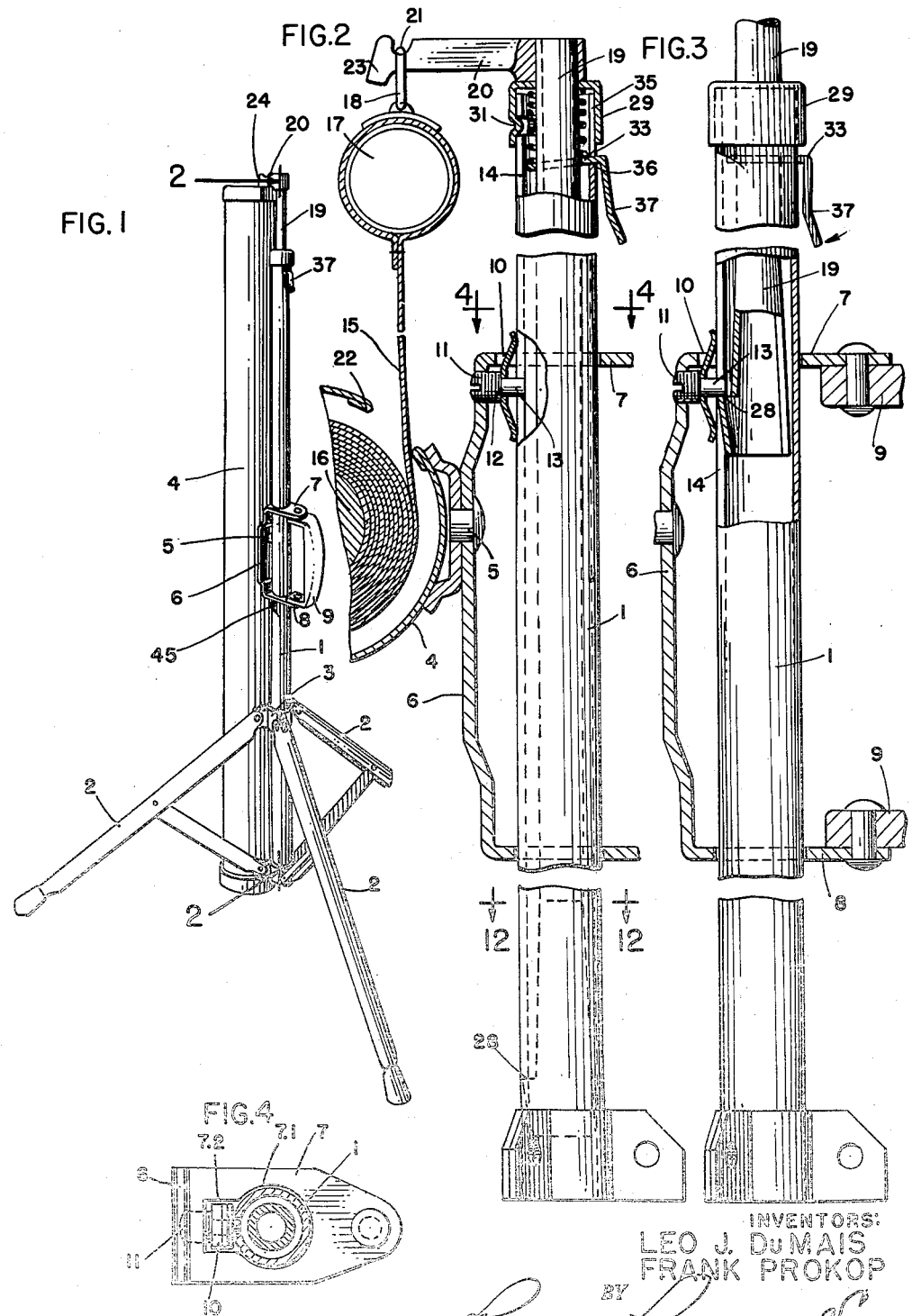
INVENTORS:
LEO J. DuMAIS
FRANK PROKOP
BY
ATT'YS

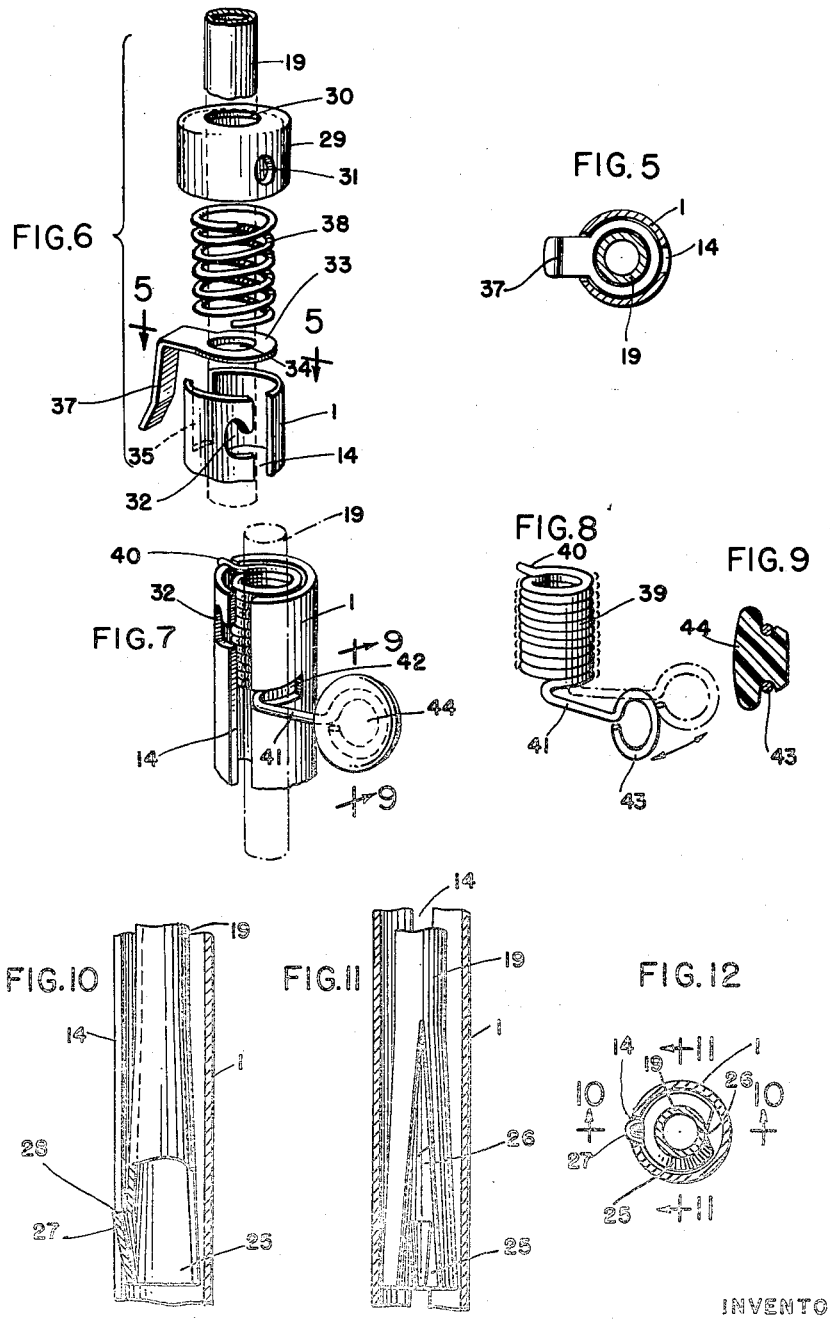

Patented Apr. 8, 1952

2,591,686

UNITED STATES PATENT OFFICE 2,591,686

PICTURE SCREEN STAND

Leo J. Du Mais and Frank J. Prokop, Chicago, Ill., assignors to Da-Lite Screen Company, Inc., Chicago, Ill., a corporation of Illinois Application March 14, 1951, Serial No. 215,498

5 Claims. (Cl. 160—24)

This invention relates to portable picture screen stands and particularly to improvements directed to simplifying the operation of setting up such stands for use and of collapsing them in a compact condition for storage.

The main objects of this invention are to provide improved structural arrangements for facilitating the adjustment of the screen stand so as to expose a desired normal area of the screen at various heights above the floor; to provide improved means for holding the screen housing at any desired elevation on the stand and coordinating this holding means with the support of the unreeled portion of the screen so that a definite area of the screen surface may be shifted to any desired height by a simple act of elongating or contracting the supporting standard; and to provide an improved form of friction clamp acting between the stand and its extension rod that is selflocking in any position of adjustment of the extension rod.

A specific embodiment of this invention is illustrated in the accompanying drawings in which:

Figure 1 is a perspective view of the improved screen stand showing its parts in their most compact relation to each other, except that its tripod legs are shown expanded for supporting the standard in an upright position.

Fig. 2 is an enlarged detail, partly brokes away and partly in section, showing the relation of the standard to its extension rod and to the screen-reel housing.

Fig. 3 is a similar view particularly directed to illustrate the manner in which the reel housing bracket is related to the extension rod.

Fig. 4 is a section taken on the line 4—4 of Fig. 2.

Fig. 5 is a section taken on the line 5—5 of Fig. 3.

Fig. 6 is an exploded perspective view of the parts that make up the friction latch acting between the standard and its extension rod.

Fig. 7 is a perspective view showing details of a modified form of such latch.

Fig. 8 is a corresponding view of the spring that forms a part of the latch shown in Fig. 7.

Fig. 9 is a sectional detail taken on the line 9—9 of Fig. 7.

Fig. 10 is a detail, partly in section and partly in elevation showing the coacting relation of the lower end of the extension rod to the standard.

Fig. 11 is a similar view taken at right angles to Fig. 10.

Fig. 12 is a section taken on the line 12—12 of Fig. 2 and indicating by lines 10 and 11 the planes on which the sectional portions of Figs. 10 and 11 are taken.

In the form shown in the drawings, the stand comprises tubular standard 1 which is upright when resting upon its tripod legs 2. The tripod legs are retractible from the position in which they are shown in Fig. 1 to a position parallel with the standard 1 by sliding the sleeve 3 upward on the standard. The screen case or housing 4 is mounted on a pivot 5 on a rider 6 which is in the form of a U-shaped bracket having upper and lower flanges 7 and 8 apertures to slidingly receive the standard 1. The flanges 7 and 8 are also connected to opposite ends of a handle 9.

A bowed spring 10 bears between the front plate of the rider 6 and the tube 1 in such manner as to hold the rider 6 by friction at any position at which it may stand with respect to the tube 1. In the form shown, the tension of the spring 10 is adjusted by means of a screw bolt 11 that has a shoulder 12 bearing on the spring 10 and a reduced stud portion 13 that extends through a perforation in the spring 10.

The standard 1 has a slot 14 extending longitudinally from end to end thereof and the stem portion 13 of the screw bolt 11 is made of suitable diameter and length to extend into said groove 14 so as to serve as a spline acting between the rider bracket 6 and the standard 1 to prevent the rider 6 from rotating on the standard while being freely slidable along it.

The screen housing 4 is swingable on a pivot 5 from the position of parallelism with the standard 1 in which it is shown in Fig. 1 to a horizontal position crosswise of the standard 1, as indicated in section in Fig. 2. The screen 15 is wound on a reel 16 supported in the housing 4 and has an end slat 17 provided with a bail 18. The standard 1 has an extension rod 19 that telescopes into the tubular body of the standard 1 and carries at its upper end a bracket arm 20 that is shaped to provide a seat 21 whereby the bail 18 is hung on the bracket arm 20 in a vertical plane that extends through the slot 22 in the housing 4 through which the screen web passes.

The bracket arm 20 is also provided with a depending lug 23 that cooperates with an appropriate seat 24 in one end of the reel housing 4 when the parts are in the position shown in Fig. 1. The lower end 25 of the extension rod 19 is expanded in diameter as indicated in Figs. 10 and 11, so as to slidingly fit within the inside surface of the tubular standard 1 to guide the extension rod 19 for straight-line, vertical movement. To facilitate the formation of this expanded end portion 25 of the extension tube 19 it may be split, as indicated at 26 in Fig. 11.

A portion of the tube 19 adjacent its lower end is struck out to form a lug 27 serving as a spline that travels in a groove 14 in the standard 1 to prevent relative rotation of the extension rod 19 within the standard 1. This lug is also shaped to provide an abrupt shoulder 28 at its upper end which, as the extension rod 19 is raised, will come into contact with the stud 13 whereupon the reel housing 4 will be carried along with any further lifting movement of the extension rod 19.

The standard tube 1 is provided with a cap 29 at its upper end, which has a perforation 30 that slidingly fits the extension rod 19 for guiding the movement of the latter. In the form shown, the cap 29 has it side wall indented to form an inwardly projecting lug 31 of appropriate form to slidingly fit the groove 14 of the standard 1 and to be turned into a bayonet slot 32 at one side of the slot 14 to lock the cap 29 in place. There is a nipping lever 33 perforated at 34 to slidingly fit the rod 19 when the lever 34 is at right angles to the rod 19, and to lock the rod 19 against downward movement when the lever 33 is tilted as in Fig. 2.

The lever 33 is seated in a recess 35 in the upper end of the wall of the tube 1 opposite the slot 14, which provides a fulcrum 36 for the lever 33. The arm 37 of the lever 33 extends downwardly along the tube 1 where it can be conveniently pressed by the thumb or finger of the operator's hand.

The nipping lever 33 is normally urged into its tilted position by means of a helical spring 38 which loosely surrounds the tube 19 and bears between the top of the cap 29 and the lever 33. This spring thus performs the function of normally tilting the lever 33 to its gripping position for holding the extension rod 19, and also the function of tending to lift the cap 29, thus holding the lug 31 firmly seated in the upturned end of the bayonet slot 32.

In Figures 7, 8 and 9 a modified form of friction latch mechanism suitable for the essential purposes of the present invention is shown. In this case, the nipping lever is omitted and its function of gripping the extension tube 9 is accomplished by changing the character of the spring so that it serves as a torsion spring instead of a compression spring and is wound on a smaller radius so as to normally grip the shaft.

In the drawing, in the form shown, the spring 39 has a helically wound body portion coiled counter-clockwise on a mandrel of slightly less diameter than the extension rod 19 and terminates in radial arms 40 and 41. The arm 40 is seated in a notch in the upper end of the standard tube 1 and the arm 41 extends into a slot 42 that is cut transversely in the wall of the tube at one side of the longitudinal slot 14.

When the arm 41 is swung in the clockwise direction indicated by arrow and broken line in Fig. 8, the convolusions of the body portion 39 of the spring will be unwound so as to cause the coils of the body portion to expand to a larger diameter and release their grip upon the extension rod 19. As shown, the arm 41 terminates in a loop formation 43 that embraces the neck of a suitably formed button 44 by means of which the lever 41 is swung.

In operation, when the device is folded in its minimum size, it will appear as shown in Fig. 1 except that the legs of the tripod 2 will be folded against the sides of the standard 1 by raising the sleeve 3.

To set up the device for use, the tripod legs 2 are first expanded to their load-carrying position and set upon the floor with the standard 1 in vertical position. The operator then presses the lever arm 37 against the side of the tube 1 to release the rod 19 from the grip of the nipping lever 33 and then raises the rod 19 sufficient to release the bracket lug 23 from its interfitting engagement with the end of the screen case 4, and turns the case to a horizontal position at right angles to the standard 1. The screen is then withdrawn from the casing by means of the bail 18 and the bail is hung into the notch 21 of the bracket arm 20.

The extension 19 is now lifted until the desired length of the screen web is unwound from the reel. When this unwinding has reached the desired maximum extent, then the shoulder 28 on the spline lug at the bottom end of the extension rod 19 will come into contact with the spline stud 13 on the rider 6 and thus lift the screen case along with any further upward movement of the extension rod, thus always maintaining this intended maximum area of screen exposure regardless of the height to which the screen is set above the floor.

The latching effect of the nipping lever 33 is such that the spring 35 automatically locks the extension 19 in any position to which it may have been adjusted while pressure is exerted on the latch arm 37. Pressure upon the arm 37 is required only for lowering the extension rod 19 into the standard 1, since an upward pull upon the rod 19 tends to loosen the grip of lever 33 and relieves the pressure of the spring 35 enough to allow free upward movement of the rod 19.

The pressure of the spring 10 against the side of standard 1 is adjusted by means of the screw 11 so as to tend to hold the rider bracket 6 yieldingly against unintentional slipping along the standard. The aperture 7.1 for the passage of the tube 1 through the bracket arm 7 has a recess 7.2 to receive one end portion of the spring 10, thus holding the spring 10 in its proper position for exerting pressure against the standard.

With the modified form of clamp, shown in Figs. 7, 8 and 9, the rod is gripped at all times against either up or down movement, except when clockwise pressure is applied to the button 44.

To knock down the device from its set-up position, the screen bail 18 is unhooked from the bracket 20, allowing the spring of the reel to draw the screen web into the case 4. The case is then moved down to its lower position on the standard, as determined by the stop 45, and turned into parallel relation with the standard 1 and then the extension 19 is pulled down into the standard until its bracket arm 20 enters the recess at the end of the case to lock the latter in the position shown in Fig. 1. Finally the sleeve 3 is slid upward on the standard 1 to retract the tripod legs 2 against the sides of the standard.

Although but one specific embodiment and a single modification of detail of the invention are shown, it will be understood that numerous details of the structure shown may be altered or omitted without departing from the spirit of the invention as defined by the following claims:

We claim:

1. A portable screen stand, comprising a supporting standard, an extension rod telescoping with said standard, clamping means on said standard normally urged into frictional engagement with said extension rod for holding same in any position of extension, and actuating means for holding said clamping means released from its engaged position.

2. A portable screen stand, comprising a supporting standard, an extension rod telescoping therewith, a nipping lever fulcrumed on said standard and adapted to hold said extension rod, a spring normally urging said nipping lever into holding engagement with said extension rod, and an arm on said lever projecting from said standard for shifting the lever out of such holding position.

3. A portable screen stand, comprising a supporting standard, an extension rod telescoping therewith, a nipping lever fulcrumed on said standard on an axis transverse to said extension rod and adapted to hold said extension rod, a spring normally urging said nipping lever downward into holding engagement with said extension rod, and an arm on said lever projecting from said standard for shifting the lever out of such holding position.

4. A portable screen stand, comprising a tubular standard supported in an upright position, an extension rod telescoping into the upper end of said standard, said standard having a longitudinal slot extending downward from its upper end and having a bayonet slot extending laterally from said longitudinal slot and then upwardly to form a seat, a cap on the upper end of said standard perforated to receive and guide said extension rod and having a lug thereon to coact with the seat of said bayonet slot for securing said cap, a nipping lever fulcrumed on said standard on an axis transverse to said extension rod and adapted to hold said extension rod, a helical spring bearing between said cap and said nipping lever to normally tilt said nipping lever downward into holding engagement with said extension rod and to normally urge said cap upward to lock said lug in said bayonet slot seat, and an arm on said lever projecting from said standard for shifting said nipping lever out of its holding engagement with said extension rod.

5. In a portable screen stand, a tubular standard, an extension rod telescoping therewith, a helical spring wound about said extension rod to normally clamp same against sliding through said spring, an arm on one end of said spring and seated on said standard for holding said spring in place therein, and a second arm extending laterally from the other end of said spring whereby the spring may be unwound to release said extension rod, said standard having a transverse slot therein through which said second arm extends and moves for such holding and unwinding of said spring.

LEO J. DU MAIS.
FRANK J. PROKOP.

REFERENCES CITED

The following references are of record in the file of this patent:

UNITED STATES PATENTS

| Number | Name | Date |
|---|---|---|
| 2,370,235 | Du Mais | Feb. 27, 1945 |
| 2,386,450 | Eller | Oct. 9, 1945 |